(12) United States Patent
Hiraoka et al.

(10) Patent No.: US 7,321,460 B2
(45) Date of Patent: Jan. 22, 2008

(54) PARTICLE FOR DISPLAY DEVICE, METHOD FOR MANUFACTURING PARTICLE FOR DISPLAY DEVICE, IMAGE DISPLAY MEDIUM AND IMAGE FORMING APPARATUS

(75) Inventors: Satoshi Hiraoka, Minamiashigara (JP); Hidehiko Soyama, Minamiashigara (JP); Yasuo Yamamoto, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 484 days.

(21) Appl. No.: 10/940,968

(22) Filed: Sep. 15, 2004

(65) Prior Publication Data

US 2005/0168800 A1    Aug. 4, 2005

(30) Foreign Application Priority Data

Jan. 30, 2004    (JP)    ............................. 2004-023750

(51) Int. Cl.
*G02B 26/00* (2006.01)
*G09G 3/34* (2006.01)
*G03G 17/04* (2006.01)

(52) U.S. Cl. .................... 359/296; 345/107; 430/32

(58) Field of Classification Search ............... 359/296; 345/107; 430/32
See application file for complete search history.

(56) References Cited

U.S. PATENT DOCUMENTS 6,844,958 B2 *    1/2005    Kawai ..................... 359/296
6,965,467 B2    11/2005    Yamamoto et al.

FOREIGN PATENT DOCUMENTS

| CN | 1424620 A | 6/2003 |
|----|-----------|--------|
| JP | A 2000-172007 | 6/2000 |
| JP | A 2001-312225 | 11/2001 |

* cited by examiner

*Primary Examiner*—Ricky Mack
*Assistant Examiner*—William C Choi
(74) *Attorney, Agent, or Firm*—Oliff & Berridge, PLC

(57) ABSTRACT

The invention provides particles for a display device having a positively or negatively chargeable property and color, and the particles have an abundance ratio of amorphous particles with a major axis to minor axis length ratio of approximately 1.2 or greater is approximately 5% or less by number.

8 Claims, 10 Drawing Sheets

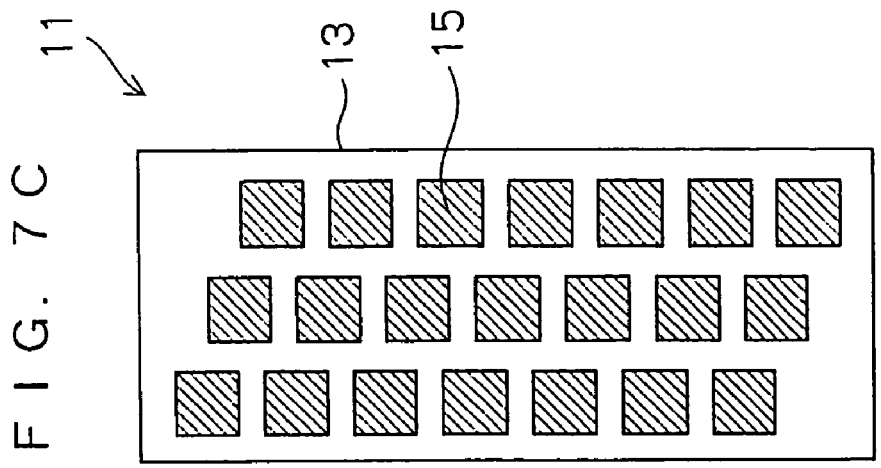
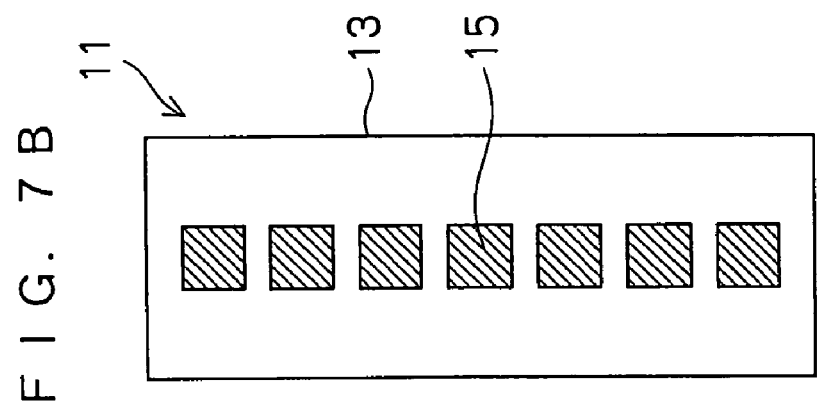
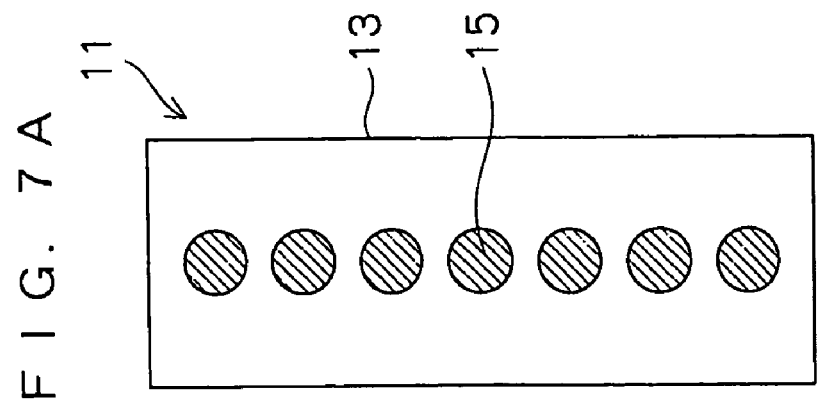

PARTICLE FOR DISPLAY DEVICE, METHOD FOR MANUFACTURING PARTICLE FOR DISPLAY DEVICE, IMAGE DISPLAY MEDIUM AND IMAGE FORMING APPARATUS

CROSS-REFERENCE TO RELATED APPLICATION

This application claims priority under 35USC 119 from Japanese Patent Application No. 2004-23750 the disclosure of which is incorporated by reference herein.

BACKGROUND OF THE INVENTION

1. Field of the Invention

The present invention relates to particles for a display device and a manufacturing method thereof; a repeatedly rewritable image display medium using the particles for a display device; and an image forming apparatus using the image display medium.

2. Description of the Related Art

A twisting ball display (display by rotation of particles separately colored with two-colors), electrophoretic display, magnetophoretic display, thermal rewritable medium and liquid crystal medium having a memorizing property have been proposed as repeatedly rewritable image display media. While these display technologies are excellent in the memorizing property, there is a problem that a paper-like white display is impossible and the contrast of the medium is low.

On the other hand, Japanese Patent Application Laid-Open (JP-A) No. 2001-312225 has proposed a display technology using a toner for solving the problems above, wherein a conductive colored toner and white particles are enclosed between two electrode substrates opposite each other; a charge is injected into the conductive toner through a charge transporting layer provided on the surface of the electrode at the non-display side substrate; the conductive colored toner in which the charge is injected is transported to the display substrate side located in opposed relation to the non-display substrate by the electric field between the electrode substrates; and the image is displayed by taking advantage of a contrast formed between the conductive colored toner and white particles by allowing the conductive colored toner to adhere to the inner side of the electrode substrate at the display side.

All the image display media are composed of solids in this display technology, which is excellent in that the white color is perfectly switched to the black color in principle (100% switching). However, there are a conductive colored toner not in contact with the charge transport layer provided on the surface of the electrode of the non-display side electrode substrate, and a conductive colored toner isolated from other conductive colored toners in the technology as described above. Such conductive colored toners are randomly distributed in the substrate without being transported by the electric field since no charge has been injected. Accordingly, it is a problem that the contrast of the display is low.

An image display technology taking advantage of an image display medium comprising a pair of substrates; and groups of plural types of particles enclosed between the substrates so as to be movable between the substrates by the applied electric field and having different colors and charging characteristics have been reported in Reports of Japan Hardcopy '99, pp. 249-252.

A high degree of whiteness is obtained by this technology. However, since the particles for an image display used for the image display medium has low fluidity, it was difficult to display an image with a clear contrast.

SUMMARY OF THE INVENTION

Accordingly, the problem of the present invention is to solve the problems as described above. The invention prepares and provides particles for a display device and a method for manufacturing the same, and an image display medium using the particles for a display device and an image forming apparatus using the image forming medium, in order to enable an image display with a high contrast using a low drive voltage even by repeatedly displaying the image for a long period of time.

The present inventors have intensively investigated the above problems in the conventional art for solving the problems above. The present inventors have found that the problems above are caused by (1) increased adhesive power among the particles and increased adhesive power between the particles and the surface of the substrate, (2) unstable charging by frictional electrification among the particles, (3) broadening of the charge distribution (distribution of charges) of the particles, and (4) low transport efficiency for separating the particles due to low fluidity of the charged particles ascribed to mutual friction.

The present inventors have made further intensive studies for eliminating the causes, and found that it is effective to properly control the shape of the particles used for image display, and have completed the invention.

A first aspect of the invention is to provide particles for a display device having a positively or negatively chargeable property and color, wherein an abundance ratio of amorphous particles with a major axis to minor axis length ratio of approximately 1.2 or greater is approximately 5% or less by number.

A second aspect of the invention is to provide a method for manufacturing particles for a display device comprising at least; forming particles having a positively or negatively chargeable property and color, in which an abundance ratio of amorphous particles with a major axis to minor axis length ratio of approximately 1.2 or greater is approximately 5% or less by number, by dispersing an oil phase in an aqueous phase, wherein the oil phase has a viscosity in the range of approximately 5 to 800 mPa·s.

A third aspect of the invention is to provide an image display medium comprising at least a pair of substrates disposed opposite each other and particle groups comprising at least two or more types of particles enclosed in a space between pair of the substrates, at least one type of the two or more types of the particles has a positively chargeable property while the other at least one type of the particles having a negatively chargeable property, the positively and negatively chargeable particles being colored differently from one another, both the positively and negatively chargeable particles containing amorphous particles having a major axis to minor axis length ratio of approximately 1.2 or greater in a proportion of 5% or less by number.

A fourth aspect of the invention is to provide an image forming apparatus for forming an image on an image display medium comprising at least a pair of substrates disposed opposite each other and particle groups comprising at least two or more types of particles enclosed in a space between pair of the substrates, at least one type of the two or more types of the particles having a positively chargeable property while the other at least one type of the particles having a negatively chargeable property, the positively and negatively chargeable particles being colored differently from one another, and both the positively and negatively chargeable particles containing amorphous particles having a major axis to minor axis length ratio of approximately 1.2 or greater in a proportion of 5% or less by number, wherein the image forming apparatus comprises an electric field generating unit for generating an electric field corresponding to the image between a pair of substrates.

BRIEF DESCRIPTION OF THE DRAWINGS

FIGS. 7A to 7C are a view showing a schematic structure of still another example (a third embodiment) of the image forming apparatus of the invention.

DETAILED DESCRIPTION OF THE INVENTION

Figure 1:
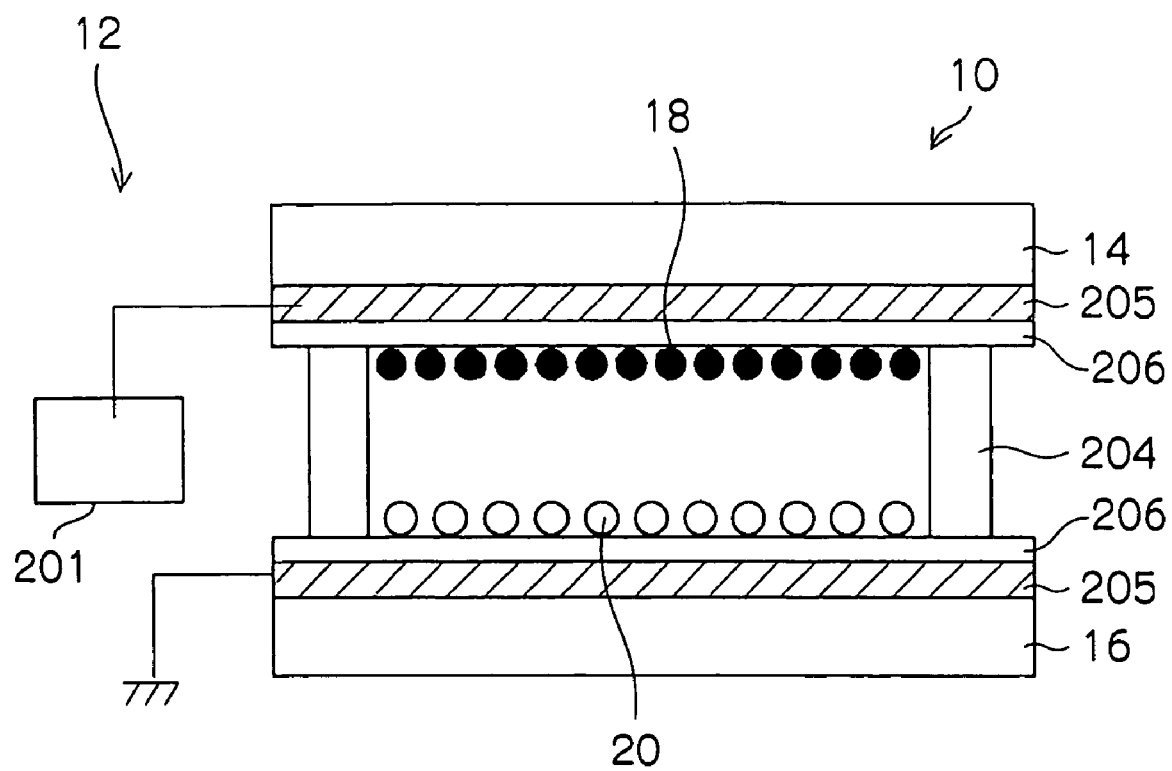
FIG. 1 is a view of a schematic construction showing an example (a first embodiment) of an image forming apparatus of the present invention.

Particles for a display device and a method for manufacturing the same of the present invention, an image display medium using the particles for a display device, and an image forming apparatus using the image display medium will be described in detail hereinafter.

(Particles for a Display Device and a Method for Manufacturing the Same)

The particles for a display device of the invention have positively or negatively chargeable property and color. The abundance ratio of amorphous particles having a major axis to minor axis length ratio of approximately 1.2 or greater is approximately 5% or less by number.

Accordingly, the drive voltage is low with high contrast image display even when the image is repeatedly displayed for a long period of time when the image is displayed using the image display medium taking advantage of the particles for a display device of the invention.

Although it is necessary that the abundance ratio of the amorphous particles having a major axis to minor axis length ratio of approximately 1.2 or greater is approximately 5% or less by number, the abundance ratio is more preferably 4% or less by number.

The contrast is lowered and the drive voltage is increased when the abundance ratio of the amorphous particles exceeds 5% by number while display of the image becomes impossible.

The abundance ratio of the amorphous particles having a major axis to minor axis length ratio of approximately 1.2 or greater is determined as follows.

Two hundred particles are observed under a scanning electron microscope (SEM) at first. Then, the major axis length and minor axis length of each particle is measured based on the observed image/photograph, and the ratio of the major axis length to the minor axis length is calculated for each particle. The number of the particles having a major axis to minor axis length ratio of larger than 1.2 is then counted, and the abundance ratio of the amorphous particles is determined by dividing the number obtained above by the total number of the particles (200 particles).

The particles for a display device of the invention may be used by combining with differently colored particles for a display device. The particles are preferably black or white particles for obtaining a high contrast in the displayed image. Accordingly, carbon black (a black colorant) or titanium oxide (a white colorant) is preferably used as the colorant contained in the particles for a display device of the invention. The contrast can be particularly improved by using titanium oxide as the white colorant since masking power can be enhanced in a wavelength region or visible light. It is needless to say that colorants other than the white and black colorants as described below may be used, if necessary.

[Constitution of Particles for a Display Device of the Invention]

The particles for a display device of the invention are made of at least a colorant and a resin. A charge controlling agent may be added, if necessary, or the colorant may also serve as the charge controlling agent. The constituting materials of the particles for a display device of the invention will be described in detail hereinafter.

-Colorant-

While carbon black and titanium oxide is favorably used as the colorant used for the particles for a display device of the invention, as described above, specific examples of them are as follows.

Known carbon black may be used without any restriction. Carbon black subjected to graft treatment with polyorganosiloxane or polyethyleneglycol, which is a substance that reacts with surface functional groups of carbon black, is preferably used.

Titanium oxide of rutile type and anatase type may be used as titanium oxide. Using titanium oxide as the colorant permits the masking power to be enhanced in the wavelength region of the visible light, and the contrast of the color density may be further improved. Rutile type titanium oxide is particularly preferable as the white colorant.

Titanium oxide comprising at least two types of particles having different particle diameters with each other is preferably used together. Titanium oxide is usually poor in dispersability, and particles having a larger particle diameter tend to be rapidly precipitated as secondary and tertiary particles even by improving dispersability since the density of titanium oxide is large. Consequently, the masking power could not be often displayed due to poor dispersion stability of the particles having a larger particle diameter. On the other hand, light scattering is insufficient when titanium oxide having a smaller particle diameter is used, and the masking power is also poor. However, dispersion stability becomes compatible with the masking power when at least two types of titanium oxide having different average particle diameters with each other are used together.

The primary particle diameter of at least one type of available titanium oxide is desirably in the range of approximately 0.1 to 1.0 µm for obtaining an optically high masking property. The primary particle diameter of the other type of titanium oxide is preferably less than 0.1 µm.

Titanium oxide having a smaller particle diameter may be subjected to a surface treatment. Surface treatment agents available include various coupling agents and solutions of organic substances in solvents in the range of not affecting the whiteness.

Pigments (referred to as "specified pigments" hereinafter) having a color difference ($\Delta E^*ab$) of light fastness of 0.2 or less and a color difference ($\Delta E^*ab$) of heat resistance of not less than 0.2 at not less than 200° C., each obtained based on "Pigment Test method" in JIS K5101, are preferably used as colorants having chromatic color other than white and black colors.

The color of the specified pigment is hardly changed by the light and heat. The specified pigment is quite finely dispersed in order to attain high degree of color rendering. These enable paints to ensure transparency required in applications such as in a back-light display as compared with conventional organic pigments commonly used for inks, and excellent characteristics such as further bright colors may be displayed.

The specified pigments having chromatic color are used, for example as pigments for color filters, and examples of them include blue pigments having a maximum absorption wavelength in the range of 400 to 500 nm, green pigments having a maximum absorption wavelength in the range of 500 to 600 nm, and red pigments having a maximum absorption wavelength in the range of 600 to 700 nm. More specifically, examples of the blue pigment include C.I. pigment blue 15 (such as 15:3, 15:4 and 16:6), 22, 60 and 64; examples of the green pigment include C.I. pigment green 7, 10, 36 and 47; and examples of the red pigment include C.I. pigment red 9, 97, 122, 123, 144, 149, 166, 168, 177, 180, 192, 215, 216 and 224.

A master batch pigment is preferably used as the specified pigment. The master batch pigment is a pre-mixture for a final molded body (the particles for a display device of the invention) devised for improving economical blending of the colorants, dispersability and uniformity of the colorants as well as for improving easiness of injection, extrusion molding and metering. Colorants having desired colors are mixed with material resins in a high concentration (usually 5 to 50% by mass), and the mixture is kneaded and formed into pellets (or flakes or plates).

Examples of the material resin used for the master batch pigment include homopolymers and copolymers of radical polymerizable monomers such as styrene, methylstyrene, chlorostyrene, vinyl acetate, vinyl propionate, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, methyl methacrylate, ethyl methacrylate, propyl methacrylate, n-butyl methacrylate, isopropyl methacrylate, n-octyl methacrylate, dodecyl methacrylate, 2-ethylhexyl methacrylate, stearyl methacrylate, acrylonitrile, methacrylonitrile, acrylamide, methacrylamide, glycidyl acrylate, glycidyl methacrylate, acrylic acid, methacrylic acid and 2-vinylpyridine; and polyester resins, polyamide resins and epoxy resins.

The method for manufacturing the master batch pigment is shown below. The specified pigment and material resin above are pulverized and dispersed in an organic solvent to prepare a pigment dispersion. A mill for stirring a medium, such as a sand mill, ball mill and attriter is used for the pulverization and dispersion treatment, which may be carried out by either a batch method or a continuous method. The organic solvent is removed from the pigment dispersion thereafter, followed by pulverization to manufacture the master batch pigment in which the specified pigment is uniformly dispersed in the material resin.

Thus when the particles for a display device of the invention are manufactured using the obtained master batch pigment, the master batch pigment is used by adding and dispersing in the monomer.

The proportion of addition of the colorant is preferably in the range of approximately 1 to 60% by mass, more preferably in the range of 5 to 50% by mass, relative to the total quantity of the particles for a display device when the specific gravity of the colorant is assumed to be 1.

The proportion of addition of the colorant is preferably in the range of approximately 1 to 60% by mass, more preferably in the range of 5 to 30% by mass, relative to the total quantity of the particles for a display device by assuming that the specific gravity of the colorant is 1 when the colorant is the specified colorant.

-Resin-

Examples of the resin constituting the particles for the display device of the invention include homopolymers and copolymers of monomers such as styrenes including styrene and chlorostyrene; monoolefins including ethylene, propylene, butylene an isoprene; vinyl esters including vinyl acetate, vinyl propionate, vinyl benzoate and vinyl butylate; a-methylene aliphatic monocarboxylic acid esters including methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinylethers including vinylmethyl ether, vinylethyl ether and vinylbutyl ether; and vinyl ketones such as vinylmethyl ketone, vinylhexyl ketone and vinylisopropenyl ketone.

Examples of the representative resin include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene and polypropylene. Further examples include polyester, polyurethane, epoxy resin, silicone resin, polyamide, modified rosin and paraffin wax.

Additional examples include polyvinyl resins such as polyolefin, polystyrene, acrylic resin, polyacrylonitrile, polyvinyl acetate, polyvinyl alcohol, vinyl chloride and polyvinyl butyral; vinyl chloride-vinyl acetate copolymer; styrene-acrylic acid copolymer; straight silicone resin comprising organosiloxane bonds and modified products thereof; fluorinated resins such as polytetrafluoroethylene, polyfluorovinyl and polyfluorovinylidene; polyester; polyurethane; polycarbonate; amino resins; and epoxy resins. These resins may be used alone, or as a mixture of plural resins.

The resins listed above may be used after cross-linking. Binder resins known as principal ingredients of toners used for conventional electrophotography may be used without any problems. The resins containing cross-linking components are preferably used.

-Other Components and Additives-

Other components and additives may be used in the particles for a display device of the invention in addition to the colorant and resin, if necessary.

For example, polymer fine particles are preferably added to the particles for a display device of the invention. While known polymers may be used for the polymer fine particles, the polymer preferably has a lower specific gravity than the colorant used, and appropriately using polymers by selecting are preferable, considering the color of the colorant when the polymer fine particles have their own colors. While the polymer particles as will be described below may be used together, they are preferably acrylic or methacrylic polymers.

While examples of the resins for the polymer fine particles include a single or a combination of plural resins of polystyrene resin, methyl polymethacrylate resin, urea-formalin resin, styrene-acrylic resin, polyethylene resin and polyfluorovinylidene resin, the resin is not restricted thereto. These resins preferably have cross-link structures, and it is more preferable that the resins have a higher refractive index than the resin phases used together.

While spherical, amorphous and flat particles may be used, the particles are more preferably spherical.

While any volume average particle diameter of the polymer fine particles may be accepted so long as the diameter is smaller than the diameter of the particles for a display device, the diameter of the polymer fine particles is preferably 10 µm or less, more preferably 5 µm or less. A sharp particle size distribution is desirable, and the distribution is more preferably monodisperse.

A part or all of the polymer fine particles comprise hollow particles from the viewpoint of preparing the particles for a display device having a small specific gravity. While any hollow particles may be used so long as the volume average particle diameter thereof is smaller than that of the particles for a display device, the volume average particle diameter of the former is preferably 10 µm or less, more preferably 5 µm or less. Particularly, the hollow particles has more preferably a volume average particle diameter of 0.1 to 1 µm, particularly 0.2 to 0.5 µm, from the viewpoint of light scattering.

The "hollow particles" refer to particles having hollow voids within the particles. The void ratio is preferably 10 to 90%. Alternatively, the "hollow particles" may be either hollow capsules or particles having porous outer walls.

Whiteness can be improved by taking advantage of light scattering while the masking property is enhanced by a difference of the refractive index at the interface between the resin layer in the outer shell and air layer within the particle when the hollow particle is the hollow capsule, or by a difference of the refractive index between the outer wall and hollow void when the hollow particle has the porous outer wall. Accordingly, the hollow particles are preferably incorporated into the particles for the white display device.

The amount of addition of the polymer fine particles is preferably 1 to 40% by mass, more preferably 1 to 20% by mass, relative to the total quantity of the particles for a display device of the invention. The effect for reducing the specific gravity by adding the polymer fine particles is readily manifested when the amount of addition of the polymer fine particles is in the range of 1 to 40% by mass, and productivity for manufacturing the particles for the display device is more improved due to the improvement of dispersability.

A resistivity adjusting agent is preferably added in the particles for a display device of the invention. Adding the resistivity adjusting agent enables charge exchange among the particles to be accelerated to enable the display image to be stabilized in an early stage. The resistivity adjusting agent as used herein refers to a conductive fine powder. The resistivity adjusting agent is preferably the conductive fine powder that appropriately causes charge exchange and leak of the charge. An increase of the amount of the charge of the particles due to long term friction between the particles and friction between the particle and substrate, or so-called charge-up phenomenon, may be avoided by adding the resistivity adjusting agent.

The favorable resistivity adjusting agent is an inorganic fine powder having a volume resistivity of $1 \times 10^6$ Ω·cm or less, preferably $1 \times 10^4$ Ω·cm or less. Examples of the inorganic powder include tin oxide, titanium oxide, zinc oxide, iron oxide and fine particles coated with various conductive oxide, for example titanium oxide coated with tin oxide. The resistivity adjusting agent is preferably colorless or has a low coloring power, or same type color of the entire particles contained in the display device. The meanings of these terms are the same as those described in the charge controlling agent. An amount of addition of the resistivity adjusting agent not interfering with the color of the colored particles causes no problems, and it is preferably approximately 0.1 to 10% by mass.

While the particle diameter of the particles for a display device of the invention is not uniquely defined, the volume average particle diameter is preferably in the range of approximately 1 to 100 µm, more preferably approximately 3 to 30 µm, for obtaining good images. A sharp particle size distribution is preferable, and the distribution is preferably monodisperse.

[Method for Manufacturing the Particles for a Display Device]

While the method for manufacturing the particles for a display device of the invention is not particularly restricted, wet manufacturing methods for preparing spherical particles such as suspension polymerization, emulsion polymerization and dispersion polymerization are preferably used since the abundance ratio of the amorphous particles can be reduced by these methods.

The wet manufacturing method uses an emulsification method for forming the particles in an emulsifying liquid with stirring after dispersing an oil phase composition in an aqueous phase. The oil phase is prepared by dissolving and dispersing the materials constituting the particles for the display device in oil.

Adjusting the viscosity of the oil phase is particularly preferable in order to reduce the abundance ratio of the amorphous particles in the particles for a display device, which are finally obtained after the emulsification process, to be 5% by number or less. While the optimum viscosity (the viscosity at 20° C.) depends on the type and content of materials constituting the particles for a display device dissolved and dispersed in the oil phase, it is preferably in the range of approximately 5 to 800 mPa·s, more preferably in the range of approximately 5.5 to 600 mPa·s, and particularly in the range of 6 to 500 mPa·s.

The viscosity range of 5 to 800 mPa·s is sufficient for forming the particles in the emulsifying liquid, and the abundance ratio of the amorphous particles in the finally obtained particles for a display device is readily controlled to be 5% or less by number since the viscosity is not too large.

An example of the wet manufacturing method for controlling the shape of the particles is described in JP-A No. 10-10775. In this wet manufacturing method, the resin is dissolved in a solvent, and the oil phase composition in which a colorant is added is dispersed in an aqueous medium (aqueous phase) in the presence of an inorganic dispersing agent to form the particles. This method takes advantage of a so-called suspension polymerization. Specifically, monomers are polymerized by suspension polymerization by adding a non-polymerizable, monomer-compatible organic solvent (which is not compatible or less compatible with the dispersing solvent) to prepare the particles. The organic solvent is removed from the particles by appropriately selecting the drying method. Freeze drying to be described hereinafter is preferable as the drying method.

The apparatus used for the emulsifying process is not particularly restricted so long as it is commercially available as an emulsifier and disperser. Examples of the emulsifier and disperser include batch emulsifiers such as Ultra-Tarax (manufactured by IKA Japan K.K.), Polytron (manufactured by Kinematica Co.), TK-Auto-Homomixer (manufactured by Tokushu Kika Kogyo Co., Ltd.), National Cooking Mixer (manufactured by Matsushita Electric Industrial Co., Ltd.); continuous emulsifiers such as Ebara Milder (manufactured by Ebara Corporation), TK Pipe-Line Homomixer and TK Homomix Line Flow (manufactured by Tokushu Kika Kogyo Co., Ltd.), Colloid Mill (manufactured by Shinko Pantec Co., Ltd.), Thrasher and Trigonal Wet Pulverizer (manufactured by MITSUI MIIKE CHEMIKAL INDUSTRY CO., LTD), Cavitron (manufactured by Eurotec Co.) and File-Flow Mill (manufactured by Pacific Machinery & Engineering Co., Ltd.); batch-continuous emulsifiers such as Clear-Mix (manufactured by M technique Co., Ltd.) and Fill-Mix (manufactured by Tokushu Kika Kogyo Co., Ltd.); high pressure emulsifiers such as Micro-Fluidizer (manufactured by MIZUHO Industrial Co., Ltd.), and Nano-Maker and Nanomizer (manufactured by Nanomizer Co.), APV Gaulin (manufactured by Gaulin Co.); film emulsifiers such as Film Emulsifying Machine (manufactured by REICA Co., Ltd.); vibration emulsifiers such as Vibro-Mixer (manufactured by REICA Co., Ltd.); and ultrasonic emulsifiers such as Ultrasonic Homogenizer (manufactured by Branson Ultrasonics Corporation).

Fine powders of hardly soluble inorganic compounds such as hardly soluble salts including $CaCO_3$, $BaSO_4$, $CaSO_4$, $MgCO_3$, BaCO3 and $Ca(PO_4)_2$; inorganic polymers such as diatomaceous earth, talc, silicic acid and clay; and metal oxide powders may be used as emulsifying aids (emulsion stabilizers) when the particles for the display device of the invention are manufactured by taking advantage of the emulsification process. Water soluble polymers such as polyvinyl alcohol, gelatin and starch may be used together with the inorganic dispersion stabilizer described above.

The surface of the particles of the inorganic dispersion stabilizer is preferably coated with a polymer having carboxylic groups in order to stably prepare the particles by coating. The polymer having the carboxyl groups available has a number average molecular weight of 1,000 to 200,000 as measured by a VPO method.

Representative examples of the polymer having the carboxylic group include acrylic acid resins, methacrylic acid resins, fumaric acid resins and maleic acid reins. Homopolymers of the monomers constituting the resins such as acrylic acid, methacrylic acid, fumaric acid and maleic acid, and copolymers thereof with other vinyl monomers may be used together. The carboxylic group may be a metal salts such as sodium salt, potassium salt and magnesium salt.

The inorganic dispersion stabilizer used has an average particle diameter in the range of 1 to 1000 nm, and the particularly preferable range is 5 to 100 nm. The amount of the inorganic stabilizer is approximately 1 to 500 parts by mass, particularly 10 to 300 parts by mass, relative to 100 parts by mass of the particles for a display device.

A polymer dispersion agent may be used as the dispersion stabilizer. The polymer dispersion agent is preferably hydrophilic, a polymer dispersion agent having carboxyl groups is preferable, and the polymer dispersion agent having non-hydrophilic groups such as hydroxypropoxy group and methoxy group is more preferably used. Example of them includes carboxymethyl cellulose and carboxyethyl cellulose, and carboxymethyl cellulose is particularly preferable. The degree of etherification and average degree of polymerization of cellulose derivatives available are 0.6 to 1.5 and 50 to 3000, respectively. The carboxyl group may form a metal salt such as a sodium salt, potassium salt and magnesium salt. These polymer dispersion agents is used so that the viscosity of aqueous media is 1 to 1000 mPa·s at 20° C., and the particularly preferable range is 1 to 2000 mPa·s.

A solvent may be used, if necessary, for dissolving the resin constituting the particles for the display device in the wet manufacturing method. The solvent is desirably able to dissolve the resin while it is not mixed with water. Examples of the solvent include ester solvents such as methyl acetate, ethyl acetate, propyl acetate and butyl acetate; ether solvents such as diethylether, dibutylether and dihexylether; ketone solvents such as methylethyl ketone, methylisopropyl ketone, methylisobutyl ketone and cyclohexanone; hydrocarbon solvents such as toluene and xylene; and halogenated hydrocarbon solvents such as dichloromethane, chloroform and trichloroethylene. These solvents are able to dissolve the polymer, and solubility in water is desirably in the range of 0 to 30% by mass. Cyclohexane is particularly preferable as the solvent considering safety, cost and productivity for industrial mass-production of the display device.

A process for removing the solvent from the emulsifying liquid is preferably provided after forming the particles in the emulsifying liquid when the solvent is used. The emulsifying solvent is removed by freeze drying in order to suppress the particles formed in the emulsifying liquid from being coagulated. The freeze drying temperature is in the range of −10 to −200° C., preferably −30 to −180° C. While the pressure for freeze drying is not higher than 40 Pa, a pressure of not higher than 13 Pa is particularly preferable.

The particles prepared by the wet manufacturing method as described above is usually dried. While known dryers such as a vacuum dryer, paddle dryer, vibrating fluid bed dryer, tube dryer and shelf dryer and air stream dryers such as flash dryer may be used, the air stream dryers such as flash dryer is preferably used for drying the particles in a short period of time.

While the particles obtained by drying can be directly used as the particles for a display device, the particle size distribution may be adjusted by a classifying operation. While the classification method include various vibrating sieves, a ultrasonic sieve, an air sieve and an wet sieve, a rotary classifier taking advantage of centrifugal force, and a wind classifier, the methods are not particularly restricted. The desired particle size distribution is obtained by using any one of these methods alone, or by combining various methods. The wet sieve is preferably used particularly when the particle size distribution is precisely adjusted.

Applying a heat treatment to the particles obtained is also favorable for arranging the shape of the particles in addition to adjusting the viscosity of the oil phase in the wet manufacturing method as described above.

A method for applying a mechanical impact force to the particles obtained by known methods such as melt-kneading, pulverization and classification [using, for example, a Hybridizer (manufactured by Nara Machinery Co., Ltd.), Angmill (manufactured by Hosokawamicron Corporation) and θ-Composer (manufactured by Tokuju Co.); a method for heating the particles; and a method for allowing fine particles to coagulate and integrate to grow the particles to a desired particle diameter may be utilized as the methods for arranging the particle shape other than the wet manufacturing method.

(Image Display Medium and Image Forming Apparatus)

The image display medium of the invention comprises at least a pair of substrates disposed opposite each other, and particle groups comprising at least two types of particle groups enclosed in the space between pair of the substrates. At least one type of the particle group of the two or more types of the particle groups is able to be positively charged, while at least one of the other type of the particle group is able to be negatively charged. Both types of the negatively and positively chargeable particles comprises the particles for the display device of the invention in the image display medium in which the positively and negatively chargeable are colored differently from one another.

Accordingly, since both the positively and negatively chargeable particles comprise the particles for the display device of the invention in the image display medium of the invention, the drive voltage is low even by repeated display of the image for a long term, which enables the image to be displayed with high contrast.

-Particle Group Comprising Two or More Types of Particles-

At least one type of the particles (first particles) of the particle group comprising two or more types of the particle groups used for the image display device of the invention is positively chargeable, while at least the other type of the particles (second particles) are negatively chargeable. The positively and negatively chargeable particles have different colors to one another.

While the positively chargeable first particles and negatively chargeable second particles were described to respectively comprise one type of particles in the description above, each of them may comprise either one type of the particles or two or more types of the particles (the first and second particles, or both the positively and negatively chargeable particles, may be collectively named as "display particles").

One type of the display particles is preferably contains white-base colorant in the image display medium of the invention. In other word, one type of the display particles preferably contains the white-base colorant. Using the white-base colorant in one type of the particles permits the coloring power of the other particles and color density contrast to be improved. Titanium oxide is preferable as the white-base colorant for coloring one type of the particles white as has been described previously. When polymer fine particles are used as the display particles, whiteness may be further enhanced by forming the polymer fine particles into hollow particles to enable higher contrast to be obtained.

The image display medium of the invention is not restricted in that one type of the display particles is white-colored. For example, it is possible that one type of the display particles is black. This is effective for switching the display of black letters to the display of differently colored letters and marks or vise versa.

While the display particles should be controlled so that one type of the display particles is positively chargeable while the other type of the display particles is negatively chargeable. Two types of the particles may be positively and negatively charged depending on the positional relation of both types of particles in charge sequence when different types of the particles are charged by collision and friction. Consequently, the position in the charge sequence can be appropriately controlled by appropriately selecting the charge controlling agent added in the display particles.

An adhesion state in which larger diameter particles are surrounded by smaller diameter particles as in the so-called two-component developer can be avoided by controlling, for example, the particle diameter and particle size distribution of the white particles and black particles to be approximately equal to one another in the display particles, which enables a high white color density and black color density to be obtained.

The variation coefficient of the particle size distribution of two types of the particles used is preferably 15% or less, and the particles are particularly monodisperse. The smaller diameter particles tend to adhere around the larger diameter particles to result in a decrease of the larger diameter particles' own color density. Alternatively, the contrast may change depending on the mixing ratio between the white and black particles. Accordingly, the mixing ratio is desirably adjusted so that the surface areas of both types of the display particles are identical to one another. Large deviation from this mixing ratio may cause strong coloring of the display with the color of the dominant particles. However, this is not true when a contrast between a deep color and pale color of the same color is required, or when the image is desired to be displayed by the color created by mixing two types of the colored particles.

-Substrate-

A pair of substrates is disposed opposite each other, and the display particles are enclosed into the space between pair of the substrates. The substrate is a conductive plate (conductive substrate), and at least one of pair of the substrates should be a transparent conductive substrate for allowing it to function as an image display medium. The transparent conductive substrate serves as a display substrate.

The substrate itself may be conductive in the conductive substrate, or the surface of an insulating support may be subjected to a conductive treatment. The substrate may be either crystalline or amorphous. Examples of the inherently conductive substrate include metals such as aluminum, stainless steel, nickel and chromium and alloy crystals thereof, and semiconductors such as Si, GaAs, GaP, GaN, SiC and ZnO.

Examples of the insulating support include polymer films, glass, quartz and ceramics. The metals listed in the examples of the inherently conductive substrates, or gold, silver or copper may be deposited on the insulating support by vacuum evaporation, sputtering and ion-plating for the conductive treatment of the insulating support.

A conductive substrate prepared by forming a transparent electrode on one surface of an insulating transparent support, or an inherently conductive transparent support is used as the transparent conductive substrate. The inherently conductive transparent support is made of a transparent conductive material such as ITO, zinc oxide, tin oxide, lead oxide, indium oxide and copper iodide.

The insulating transparent support is made of transparent inorganic materials such as glass, quartz, sapphire, MgO, LiF and $CaF_2$; films or plates of transparent organic resins such as fluorinated resins, polyester, polycarbonate, polyethylene, polyethylene terephthalate and epoxy resins; and optical fibers and SELFOC optical plates.

Transparent conductive materials such as ITO, zinc oxide, tin oxide, lead oxide, indium oxide and copper iodide are used for the transparent electrode provided on one surface of the transparent support. These electrodes are formed by vapor deposition, ion-plating and sputtering, or thin films of metals such as Al, Ni and Au are formed by vapor deposition or sputtering so that the film is semi-transparent.

In a preferable embodiment, a protective layer for maintaining an appropriate surface state is provided on the opposed surface since the surface state affects the polarity of charging of the particles. The protective layer may be selected mainly considering adhesive property to the substrate, transparency and charge sequence as well as surface contamination protective effect. Specific examples of the materials of the protective layer include polycarbonate resins, vinyl silicone resins and fluorine containing resins. The resins used are selected considering the constitution of main monomers of the particles used and a small difference of frictional electrification from that of the particles.

The image may be formed on the image display medium of the invention as described above by taking advantage of an image forming apparatus provided with an electric field generating apparatus for generating an electric field corresponding the image between a pair of substrates constituting the image display medium.

-Embodiments for Implementation of the Image Forming Apparatus of the Invention- The image forming apparatus of the invention using the image display medium of the invention will be described in detail hereinafter with reference to the drawings. The parts having the same functions are given the same reference numerals throughout the drawings, and descriptions thereof are omitted.

First Embodiment

FIG. 1 is a view of a schematic construction showing an example (a first embodiment) of an image forming apparatus of the present invention.

An image forming apparatus 12 according to the first embodiment comprises a voltage applying device 201. An image display medium 10 comprises a spacer 204 between a display substrate 14 for displaying an image and a non-display substrates 16 which is in opposed relation thereto, so that the outer circumference of these substrate is hermetically sealed. Black particles 18 and white particles 20 are enclosed, as display particles, in the space partitioned by the display substrate 14, the non-display substrate 16 and the spacer 204. While transparent electrodes 205 are provided on the opposed surfaces of the display substrate 14 and non-display substrate 16, respectively, as will be described below, the transparent electrode 205 provided on the opposed surface of the non-display substrate 16 is grounded, while the transparent electrode 205 provided on the opposed surface of the display substrate 14 is connected to the voltage applying device 201.

The image display medium 10 will be described in detail hereinafter.

Glass substrates (substrates made of 7059 glass) with a size of 50×50×1.1 mm comprising ITO transparent electrodes as the transparent electrodes 205 on the opposed surfaces can be used for the display substrate 14 and non-display substrate 16 constituting the image display medium 10. A polycarbonate rein layer 206 (a layer comprising a polycarbonate resin (PC-Z) with a thickness of 5 μm) is provided on the surface of the transparent electrode 205 provided on each opposed surface of the display substrate 14 and non-display substrate 16.

The spacer 204 is formed by forming a space by cutting the central portion of a silicone rubber plate (40×40×0.3 mm) into a 15×15 mm square shape.

The silicone rubber plate is placed on the opposed surface of the non-display substrate 16 for preparing the image display medium 10. Then, spherical white particles 20 containing titanium oxide with a volume average particle diameter of 20 μm, and spherical black particles 18 containing carbon with a volume average particle diameter of 20 μm are mixed in a mass ratio of 2:1 as display particles, and approximately 15 mg of the mixed particles are sieved down onto the square cut portion of the silicone rubber plate provided on the opposed surface side of the non-display substrate 16 through a screen. The opposed surface side of the display substrate 14 is adhered onto the silicone rubber plate, and the silicone rubber plate and both substrates are adhered by press-holding the both substrates with a double-clip to form the image display medium 10.

The particles of the display device of the invention are used for the black particles 18 and white particles 20.

Second Embodiment

The second embodiment of the invention will be described in detail with reference to the drawings.

Figure 2:
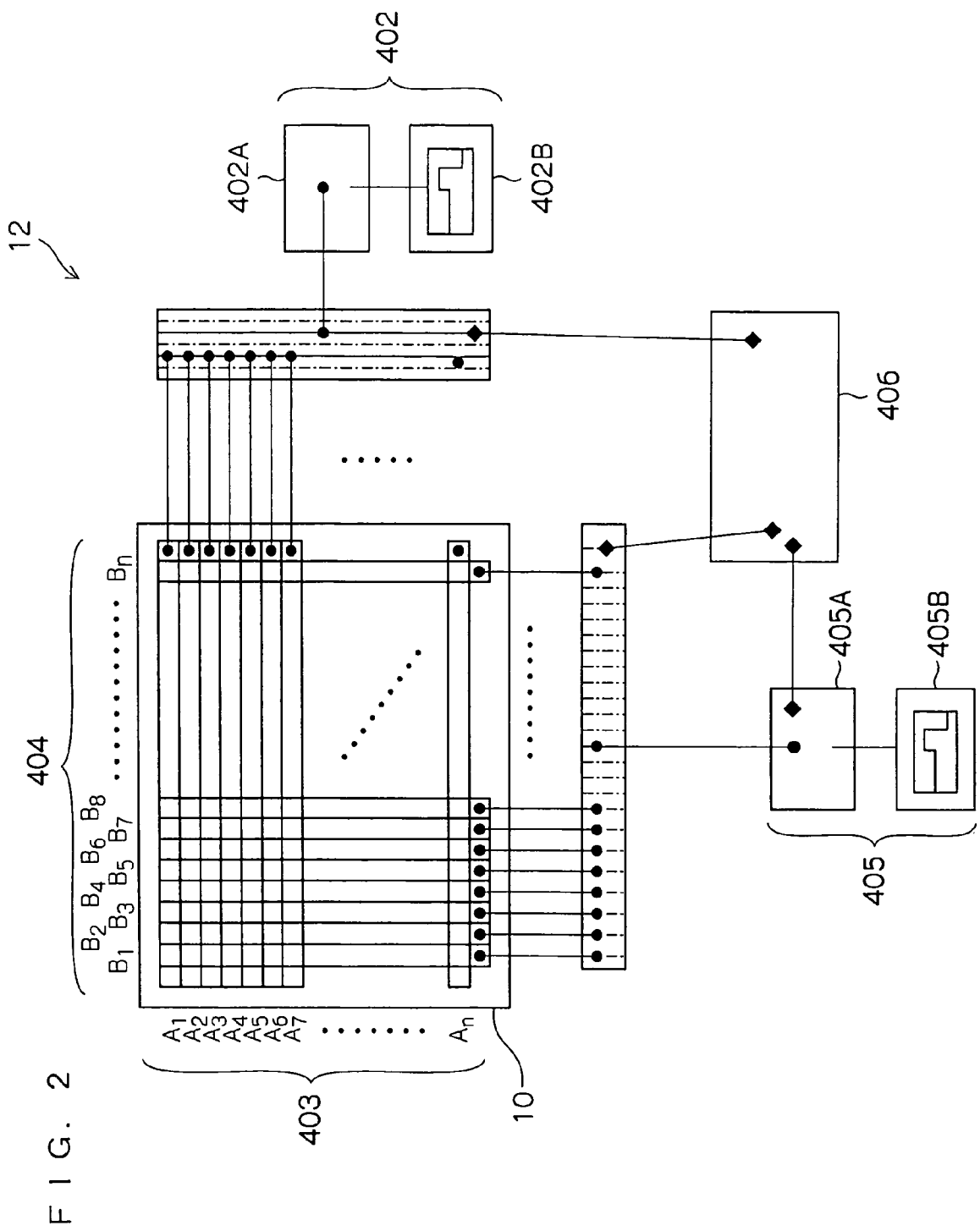
FIG. 2 is a diagram of a schematic configuration showing another example (a second embodiment) of the image forming apparatus of the invention.

FIG. 2 is a diagram of a schematic configuration showing another example (a second embodiment) of the image forming apparatus of the invention, and shows the image forming apparatus 12 for forming images on the image display medium 10 by passive matrix drive.

Electrodes 403An and 404Bn (n is a positive integer) for controlling lateral and vertical voltages are disposed in the plane directions of the image display medium 10 in which a plural display particle groups (not shown) having different chargeability are enclosed so that the image display medium has a passive matrix structure. The electrode 403An is connected to a power source 405A of an electric field generating apparatus 405 comprising a waveform generating apparatus 405B and the power source 405A, and the electrode 404Bn is connected to a power source 402A of am electric field generating apparatus 402 comprising a waveform generating apparatus 402B and the power source 402A. The electrode 404Bn, power source 405A and electrode 403An are connected to a sequencer 406.

A voltage is generated on each electrode 403An and 404Bn from the electric field generating apparatus 402 or 405 for displaying the image to control drive of the voltage of each electrode by controlling the voltage drive timing of the electrode through the sequencer 406. A voltage that is able to drive the display particles in one line unit is applied on one surface of each electrodes 403A1 to An, while a voltage corresponding to image information is simultaneously applied on the other surface of each electrodes 404B1 to Bn on the surfaces.

Figure 3:
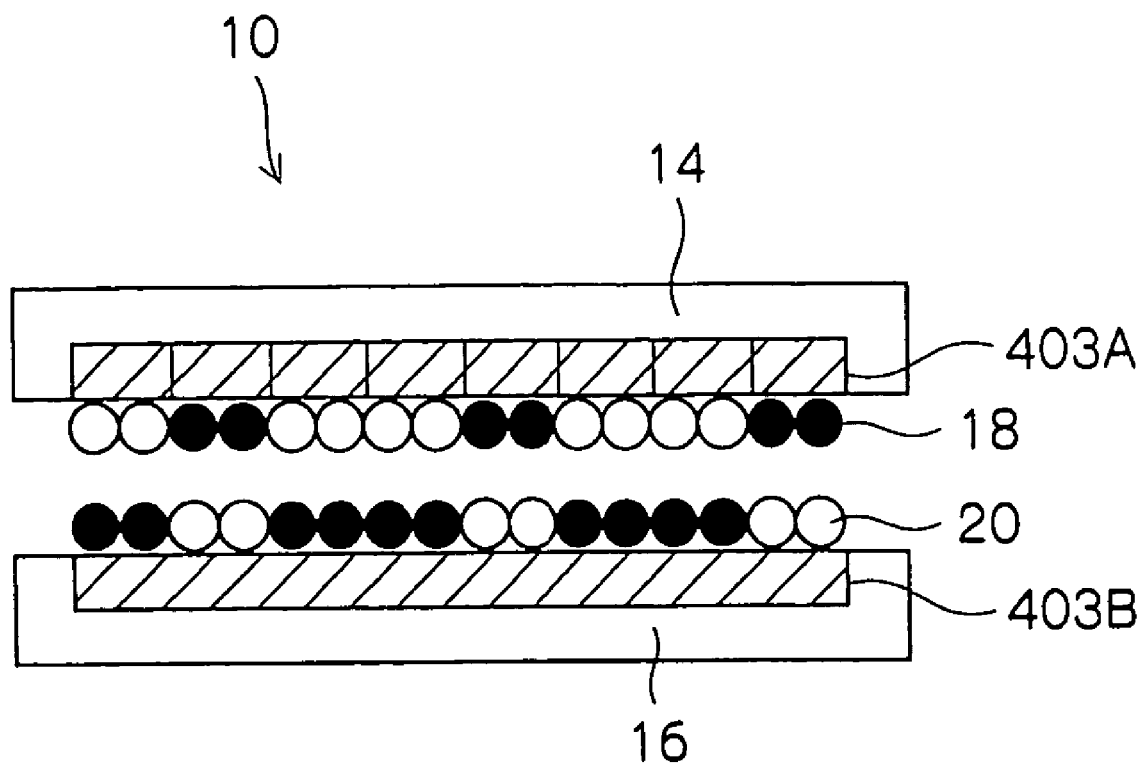
FIG. 3 is a schematic, sectional view of the image forming section (an image display medium) in an arbitrary plane of the image forming apparatus shown in FIG. 2.
Figure 4:
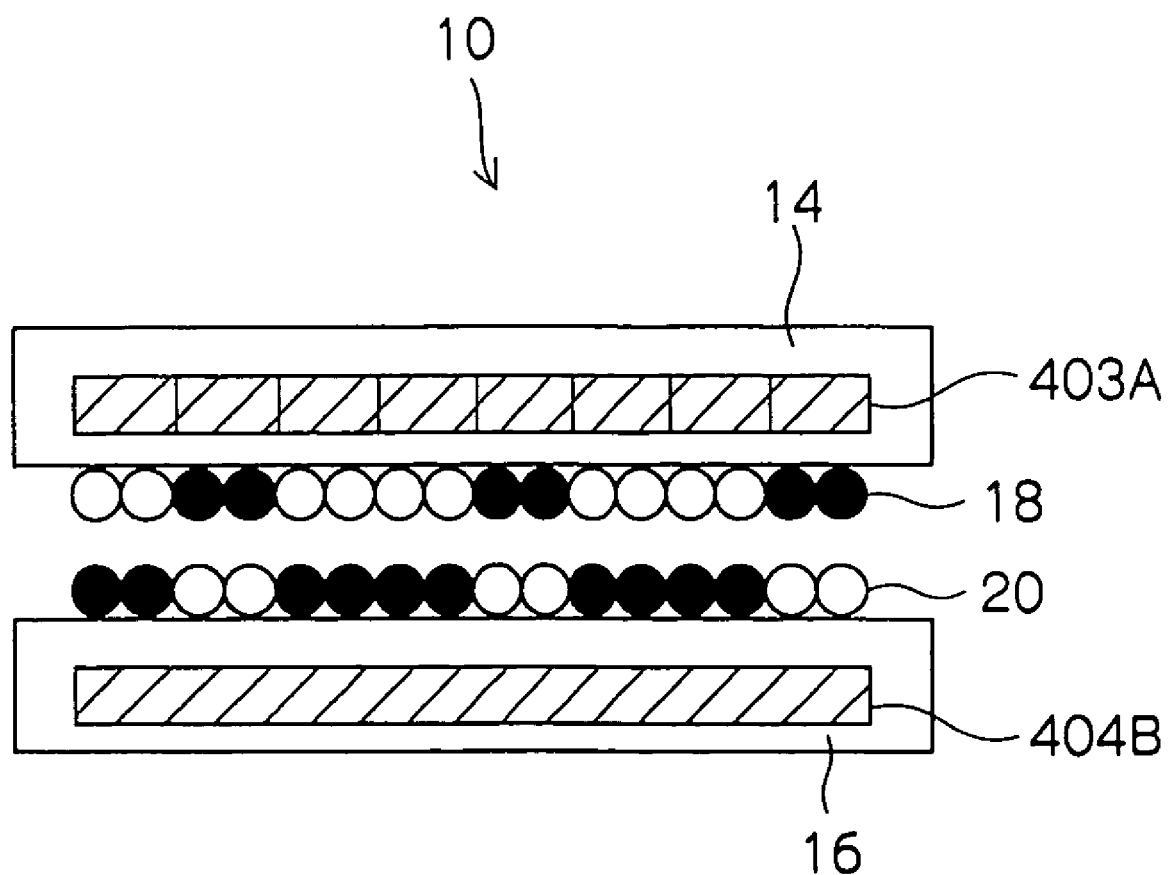
FIG. 4 is another schematic, sectional view of the image forming section (the image display medium) in an arbitrary plane of the image forming apparatus shown in FIG. 2.
Figure 5:
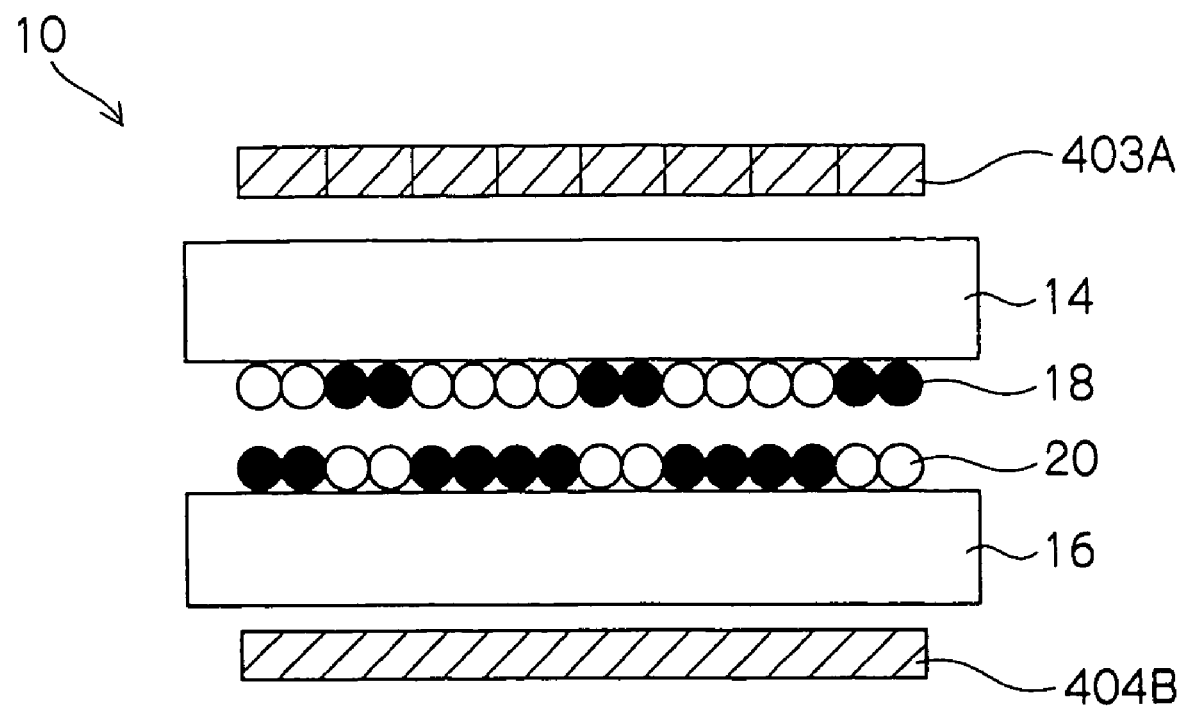
FIG. 5 is still another schematic, sectional view of the image forming section (the image display medium) in an arbitrary plane of the image forming apparatus shown in FIG. 2.

FIGS. 3 to 5 show a schematic, sectional view of the image forming section (an image display medium) in an arbitrary plane of the image forming apparatus 12 shown in FIG. 2.

The display particles 18 and 20 are in contact with the electrode surface or substrate surface, and at least one surface of the substrates 14 and 16 is transparent so that the color of the display particles 18 and 20 can be seen through from the outside. The electrodes 403A and 404B may be integrated by being embedded at the facing surface sides of the substrates 14 and 16 as shown in FIG. 3, or by being embedded into the substrates 14 and 16 as shown in FIG. 4. Alternatively, The electrodes 403A and 404B may be separately provided slightly apart from the surface of the display substrate 14 and the non-display substrate 16, which face each other as shown in FIG. 5 (i.e., The electrodes 403A and 404B can be positioned slightly apart from the opposite outer surfaces of the display substrate 14 and the non-display substrate 16).

Display by passive matrix drive is possible by setting an appropriate electric field on the image forming apparatus 12. Drive is possible so long as the display particles 18 and 20 have thresholds for moving against the voltage, and is not restricted by the colors of the display particles 18 and 20, polarity of charging and the amount of charging.

Third Embodiment

Figure 6:
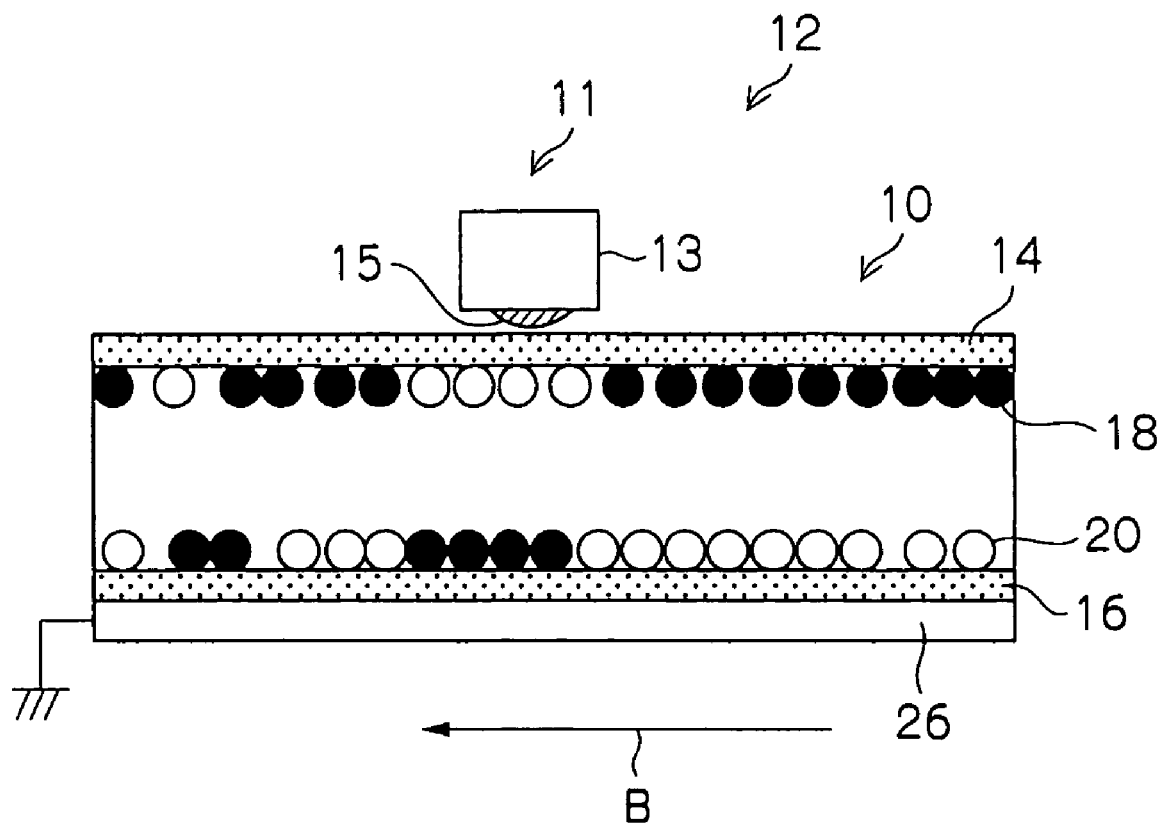
FIG. 6 is a view showing a schematic structure of still another example (a third embodiment) of the image forming apparatus of the invention.

The third embodiment of the invention will be described in detail hereinafter with reference to the drawings. FIG. 6 a view showing a schematic structure of still another example (a third embodiment) of the image forming apparatus of the invention, or particularly an image forming apparatus using a printing electrode.

An image forming apparatus 12 shown in FIG. 6 comprises a printing electrode 11 and a grounded opposed electrode 26 disposed in opposed relation to the printing electrode.

The image display medium 10 is able to be transported in the direction of arrow B between the printing electrode 11 and opposed electrode 26. The image display medium 10 comprises a pair of substrates (display substrate 14 and non-display substrate 16) and display particles 18 and 20 enclosed between the substrates. The non-display substrate 16 side is adjacent to or in contact with the opposed electrode 26 when the image display medium is transported in the direction of arrow B, and the particles at the display substrate side is transported so that it is adjacent to the printing electrode 11. The printing electrode 11 comprises a substrate 13 and an electrode 15 provided at the display substrate 14 side of the substrate 13, and the printing electrode 11 is connected to a power source.

The disposition and shape of the electrode 15 provided at the display substrate 14 side of the printing electrode 11 will be described below. FIGS. 7A to 7C are a view showing a schematic structure of still another example (a third embodiment) of the image forming apparatus of the invention, and show the surface on which the electrodes 15 of the printing electrode 11 are provided when viewed from the non-display substrate 16 side in the direction of the display electrode 14 in FIG. 6.

As shown in FIG. 7A, the electrode 15 is arranged in a line with a given space depending on the resolution of the image in a direction (the main scanning direction) approximately perpendicular to the transport direction (the direction of arrow B in the drawing) of the image display medium 10 on one surface of the display substrate 14. The electrode 15 may be a square as shown in FIG. 7B. The electrode 15 may be arranged as a matrix as shown in FIG. 7C.

Figure 8:
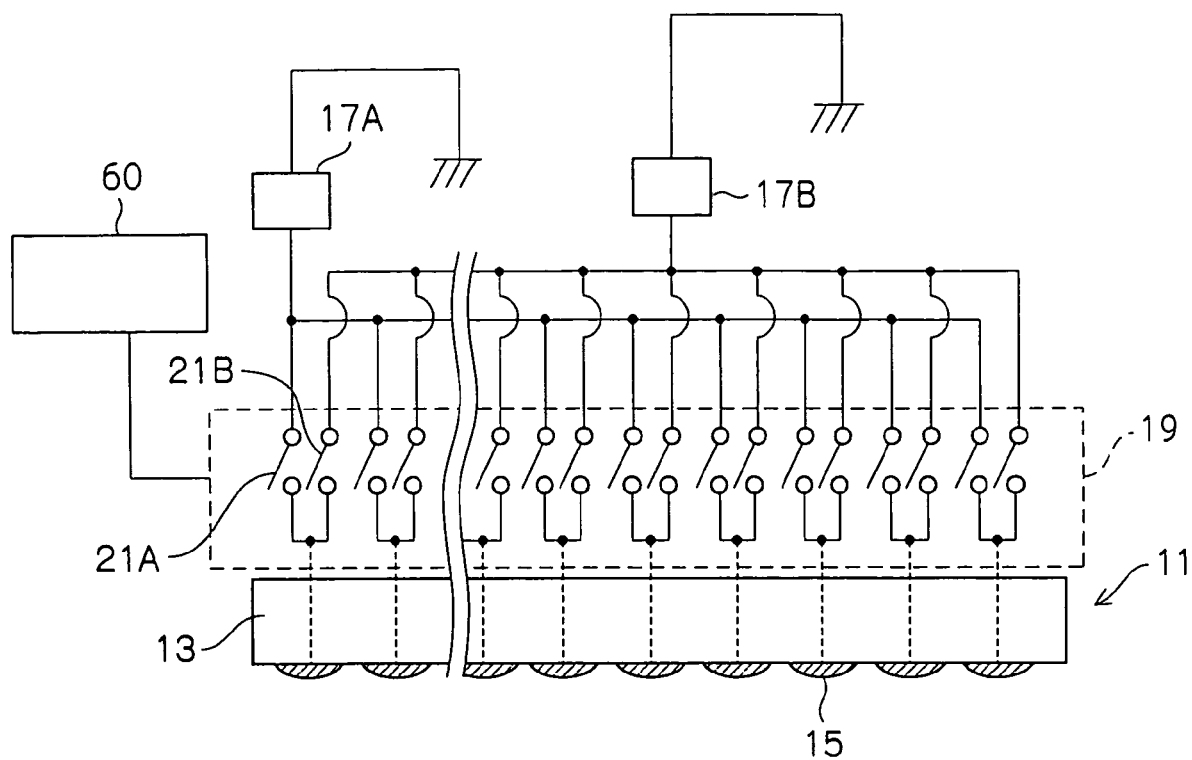
FIG. 8 is a diagram of a schematic structure of the printing electrode.

Details of the printing electrode will be described in detail below. FIG. 8 shows a diagram of a schematic structure of the printing electrode.

An AC power source 17A and a DC power source 17B are connected to respective electrodes 15 via a connection control section 19 as shown in FIG. 8. The connection control section 19 comprises a plural switches 21A one end thereof is connected to the electrode 15 and the other end thereof is connected to the AC power source 17A, and a plural switches 21B one end thereof is connected to the electrode 15 and the other end thereof is connected to the DC power source 17B. ON and OFF of the switches 21A and 21B are controlled by a controller 60 to electrically connect the AC power source 17A and DC power source 17B to the electrode 15, thereby an AC voltage or a DC voltage, or a voltage formed by convolution of the AC voltage and DC voltage, can be applied to the electrode.

The action in the third embodiment will be then described below.

When the image display medium 10 is transported by a transport device (not shown) in the direction of arrow B in the drawing between the printing electrode 11 and opposed electrode 26, all the switches 21A are turned ON by the indication of the controller 60 to the connection control section 19, which permits a DC voltage to be applied on all the electrodes 15 from the AC power source 17A.

At least two types of display particle groups are enclosed in the space between a pair of the electrodes having no charge in the image display medium 10. The black particles 18 and white particles 20 reciprocate between the display substrate 14 and non-display substrate 16 when the AC voltage is applied to the electrode 15. Consequently, the black particles 18 and white particles 20 are charged by friction between the display particles and display particles and substrates. For example, the black particles 18 are positively charged, while the white particles 20 are not charged or negatively charged.

Explanations below are made by assuming that the white particles 20 are negatively charged. The connection control section 19 permits only the switches corresponding to the electrodes 15 at the positions depending on the image data to be turned ON by indications from the controller 60, and a DC voltage is applied to the electrodes 15 at the positions corresponding to the image data. For example, the DC voltage is applied to the non-image portions while no DC voltage is applied to the image portions. As a result, the positively charged black particles 18 located at the portions where the printing electrode 11 is facing the display substrate 14 is transported to the non-display substrate 16 side by the action of the electric field. On the other hand, the negatively charged white particles 20 located at the non-display substrate 16 side is transported to the display substrate 14 side by the action of the electric field. Accordingly, since only the white particles 20 appear at the display substrate 14 side, no image is displayed at the portion corresponding to the non-image portion.

When no DC voltage is applied to the electrode 15, on the other hand, the positively charged black particles 18 located at the portion where the printing electrode 11 is facing the display substrate 14 remain to stay at the display substrate 14 side by the action of the electric field. The positively charged back particles 18 located at the non-display substrate 16 side are transported to the display substrate 14 side by the action of the electric field. Consequently, since only the back particles 18 appear at the display substrate 14 side, the image is displayed at the portions corresponding to the image portions.

Accordingly, the image is displayed at the portions corresponding to the image portions since the back particles 18 appear only at the display substrate 14 side. The black particles 18 and white particles 20 are transported depending on the image, which is displayed at the display substrate 14 side. Only the black particles 18 are transported by being affected by the electric field when the white particles 20 are not charged. Display of the image is possible because the black particles 18 at the image no-display site are transported to the non-display substrate 16 and the image is concealed by the white particles 20 at the display substrate side 14. The displayed image is maintained by the display particles' own adhesive power after quenching the electric field generated between the substrates of the image display medium 10. Since these display particles are able to be transported again by applying an electric field between the substrates, the image is able to be repeatedly displayed on the image forming apparatus 12. This image display apparatus is highly safe since the charged particles are transported by the electric field using air as a medium. High speed response is satisfied since the viscous drag of air is low.

Fourth Embodiment

Figure 9:
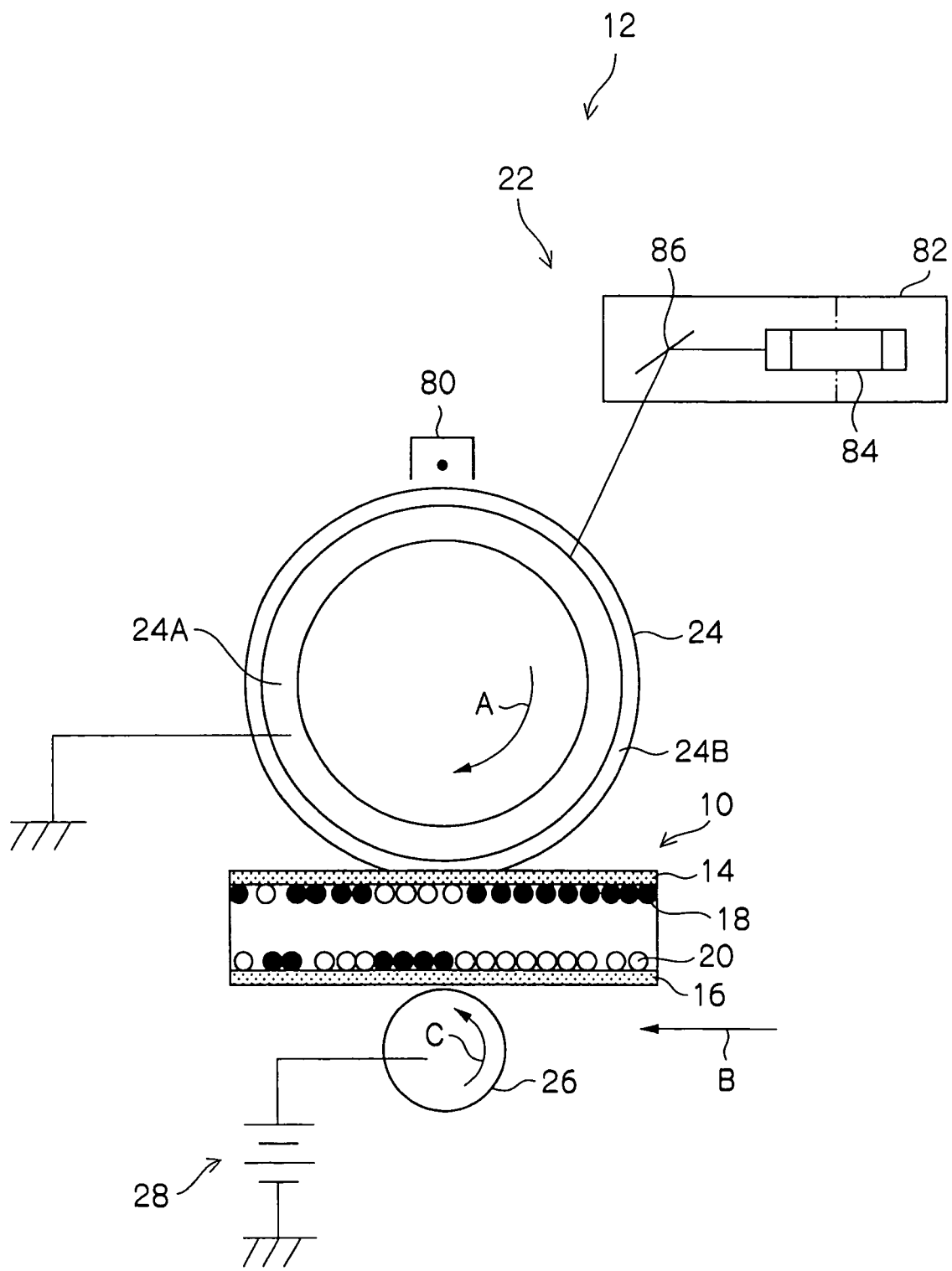
FIG. 9 is a view showing a schematic structure of yet another example (a fourth embodiment) of the image forming apparatus of the invention.

The forth embodiment of the invention will be described in detail with reference to the drawings. FIG. 9 is a view showing a schematic structure of yet another example (a fourth embodiment) of the image forming apparatus of the invention, which shows an image forming apparatus using an electrostatic latent image carrier.

The image forming apparatus 12 shown in FIG. 9 comprises a drum of the electrostatic latent image carrier 24 rotatable in the direction of arrow A, and a drum of an opposed electrode 26 rotatable in the direction of arrow C dispose in opposed relation to arrow A. The image display medium 10 having the display particles enclosed in the space between a pair of substrates is able to be inserted between the electrostatic latent image carrier 24 and opposed electrode 26 in the direction of arrow B.

A charging apparatus 80 is disposed around the electrostatic latent image carrier 24 at an approximately opposed side to the side where the opposed electrode 26 is provided so that the charging apparatus comes close to the electrostatic latent image carrier 24. A light beam scanning apparatus 82 is disposed so that an electrostatic latent image is able to be formed on the surface of the electrostatic latent image carrier 24 at the arrow A direction side of the charging apparatus 80. An electrostatic latent image forming portion 22 is constituted by these three members. A photosensitive drum 24 may be used as the electrostatic latent image carrier 24.

A photoconductive layer 24B is formed at the outer circumference side of the conductive substrate 24A made of a drum of aluminum or SUS of the photosensitive drum 24. Various known materials may be used for the photoconductive layer 24B. The materials available are, for example, inorganic photoconductive materials such as α-Si, α-Se and $As_2Se_3$, and organic photoconductive materials. The layer can be formed by plasma CVD, vapor deposition and dipping.

A charge transport layer and an overcoat layer may be formed, if necessary. The conductive substrate 24A is grounded. The charging apparatus 80 is provided in order to uniformly charge the surface of the electrostatic latent image carrier 24 at a desired voltage. Any charging apparatus 80 may be used so long as it is able to charge the surface of the photosensitive drum 24 at an arbitrary voltage. A corotron electrifier is used for uniformly charging the surface of the photosensitive drum 24 in this embodiment, wherein a high voltage is applied to an electrode wire, and corona discharge is generated between the electrode wire and the electrostatic latent image carrier 24.

Other known electrifiers available include those in which a conductive roll member, brush or film member is made to contact the photosensitive drum 24 to charge the surface of the photosensitive drum by applying a voltage thereto.

The light beam scanning apparatus 82 is provided in order to form an electrostatic latent image on the electrostatic latent image carrier 24 by irradiating a fine light spot on the surface of the charged electrostatic latent image carrier 24 based on an image signal. The light beam scanning apparatus 82 available irradiates a light beam on the surface of the photosensitive drum 24 according to image information to form an electrostatic latent image on the uniformly charged photosensitive drum 24. A ROS (raster output scanner) apparatus is used in this embodiment, wherein a laser beam adjusted to a desired spot diameter is turned ON and OFF depending on the image signal using an imaging optical system comprising a polygon mirror 84 and shuttle mirror 86, and a light source and lens (not shown) provided in the light beam scanning apparatus 82, and the surface of the photosensitive drum 24 is scanned with a light by unit of the polygon mirror 84. Otherwise, an LED head in which LEDs are arranged depending on the required resolution may be used.

Figure 10:
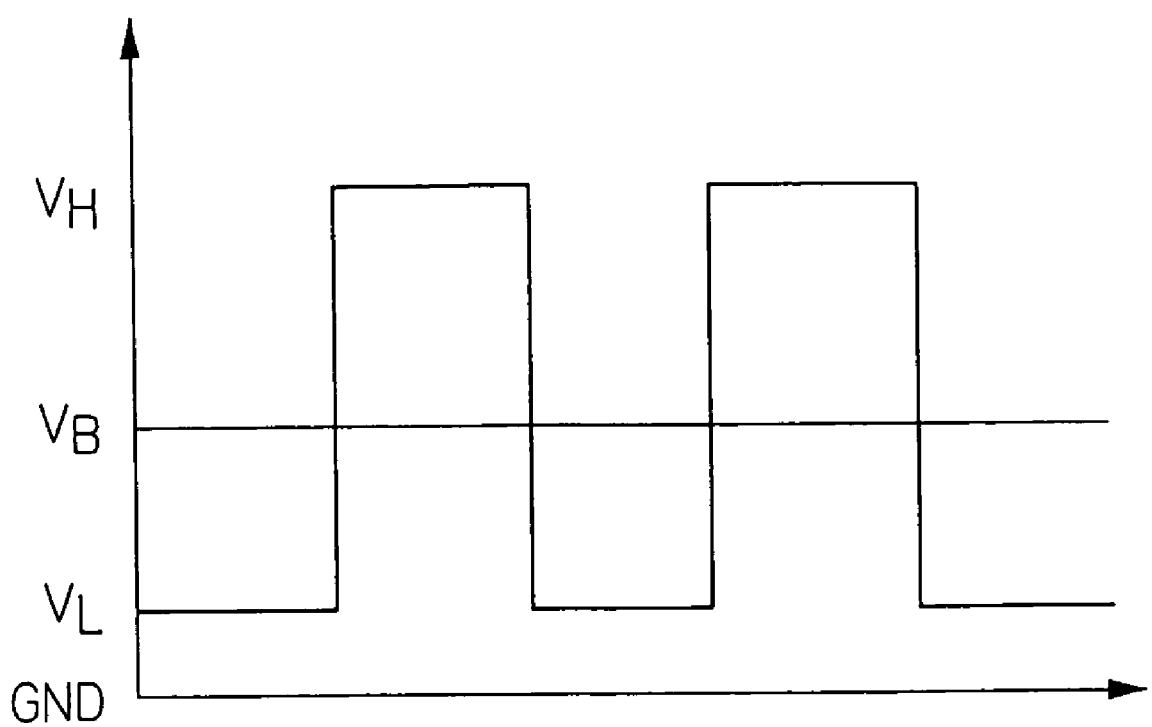
FIG. 10 is a graph showing potentials at an electrostatic latent image carrier relative to opposite electrodes.

The opposed electrode 26 is composed, for example, of an elastic conductive roll member, which permits the roller to make close contact with the image display medium 10. The opposed electrode 26 is disposed at a position opposed to the electrostatic latent image carrier 24 with interposition of the image display medium 10 transported by a transport device (not shown) in the direction of arrow B in the drawing. A DC power source 28 is connected to the opposed electrode 26, to which a bias voltage $V_B$ is applied by the DC power source 28. When the potential at a positively charged portion and the potential at a non-charged portion on the electrostatic latent image carrier 24 are denoted as $V_H$ and $V_L$, respectively, the applied bias voltage $V_B$ is adjusted, for example, to an intermediate voltage between $V_H$ and $V_L$ as shown in FIG. 10.

The action in the fourth embodiment will be described below.

When the electrostatic latent image carrier 24 starts to rotate in the direction of arrow A as shown in FIG. 9, an electrostatic latent image is formed on the electrostatic latent image carrier 24 by the electrostatic latent image forming part 22. On the other hand, the image display medium 10 is transported in the direction of arrow B between the electrostatic latent image carrier 24 and opposed electrode 26 by a transport device (not shown). The bias voltage $V_B$ as shown in FIG. 10 is applied to the opposed electrode 26, while the potential of the electrostatic latent image carrier 24 at the position facing the opposed electrode 26 is adjusted to $V_H$. Consequently, when the portion of the electrostatic latent image carrier 24 facing the display substrate 14 is positively charged (non-image portion) and when the black particles 18 are adhered on the portion of the display substrate 14 facing the electrostatic latent image carrier 24, the positively charged black particles 18 are transported from the display substrate 14 side to the non-display substrate 16 side to allow the particles to adhere on the non-display substrate 16. Since only the white particles 20 appear at the display substrate 14 side, no image is displayed on the portion corresponding to the non-image portion.

When the portion of the electrostatic latent image carrier 24 facing the display substrate 14 is not positively charged (image portion) and when the black particles 18 are adhered on the portion of the non-display substrate 16 facing the opposed electrode 26, the potential of the electrostatic latent image carrier 24 at the position facing the opposed electrode 26 is $V_L$. Accordingly, the charged black particles 18 are transported from the non-display substrate 16 side to the display substrate 14 side, and adhere on the display substrate 14. As a result, only the black particles 18 appear at the display substrate 14 side to enable the image to be displayed on the portion corresponding to the imaging portion.

The black particles 18 are thus transported depending on the image to enable the image to be displayed on the display substrate 14 side. The displayed image is maintained after quenching the electric field generated between the substrates of the image display medium 10 by the particles' own adhesive strength and a mirror image power between the particles and substrate. Since rearrangement of the black particles 18 and white particles 20 is possible by repeatedly generating the electric field between the substrate, the image is able to be repeatedly displayed with the image forming apparatus 12.

Transport of the black particles 18 is possible even when the black particles 18 are adhered on either the display substrate 14 or non-display substrate 16, since a bias voltage is applied to the opposed electrode 26. Consequently, the black particles 18 are not required to be adhered on one of the substrate sides in advance, thereby an image with a high contrast and sharpness can be formed. The display device is highly safe because the charged particles are transported by the electric field using air as a medium. The requirement of high response speed may be satisfied due to low drag viscosity of air.

While the embodiments of the image forming apparatus of the invention using the image display medium of the invention has been described above with reference to the drawings, the image forming apparatus of the invention is not restricted to these embodiments, and different constructions depending on the requirements are possible. While the combination of the colors is restricted to black and white in the description, the combination is not restricted thereto, and display particles having desired colors mat be appropriately selected, if necessary.

EXAMPLES

While the present invention is described below with reference to examples, these examples by no means restrict the invention.

(Preparation of White Particles W1)

-Preparation of Dispersion A-

The following components are mixed, and is pulverized with a ball mill using zirconia balls with a diameter of 10 mm for 20 hours to prepare dispersion A. The viscosity of dispersion A (an oil phase) is 589 mPa·s.

<Composition>
cyclohexyl methacrylate: 56 parts by mass
titanium oxide (white pigment): 38 parts by mass (Tiepake CR63, primary particle diameter 0.3 µm, manufactured by Ishihara Sangyo Kaisha, Ltd.)
polymer fine particle (hollow particle): 5 parts by mass (primary particle diameter 0.3 µm, SX 866 (A), manufactured by JSR Corporation)
charge controlling agent: 1 part by mass (tradename:SBT-5-0016, manufactured by Orient Chemical Industries, Ltd.)

-Preparation of Dispersion B-

The following components are mixed, and is pulverized with a ball mill using zirconia balls by the same method as preparing dispersion A to prepare dispersion B.

<Composition>
calcium carbonate: 40 parts by mass
water: 60 parts by mass

-Preparation of Dispersion C-

The following components are mixed, and are degassed in an ultrasonic wave bath for 10 minutes followed by stirring with an emulsifier to prepare a mixed solution C.

<Composition>
dispersion B: 7.0 g
20% aqueous sodium chloride solution: 50 g

Dispersing agent A (35 g), divinyl benzene (1 g), polymerization initiator (tradename:V601, 0.35 g, dimethyl-2, 2'-azobis-2-methyl propionate, manufactured by Wako Pure Chemical Industries, Ltd.) are weighed and thoroughly mixed, and the mixture is degassed in an ultrasonic wave bath for 10 minutes. The mixed solution is poured into mixed solution C, and emulsified with an emulsifier.

Then, the emulsion is poured into a bottle, and sufficiently evacuated with a syringe by capping with a silicone cap followed by injecting nitrogen gas to obtain particles by allowing the emulsion to react for 10 hours at 70° C. thereafter. The fine particles obtained are dispersed in ion-exchange water, and calcium carbonate is decomposed with aqueous hydrochloric acid solution followed by filtration. The emulsion is washed with a sufficient amount of distilled water, filtered through nylon sieves with a pore size of 10 µm and 15 µm to adjust the particle size. The particles are dried, and white particles W1 with an average particle diameter of 14.16 µm (the particles for the display device of the invention) are obtained. The abundance ratio of amorphous particles in white particles W1 is determined to be 2.5% by a conventional method using FE-SEM (field emission scanning electron microscope).

(Preparation of White Particles W2)

White particles W2 are prepared by the same method as in preparing white particles W1, except that the following dispersion B is used in place of dispersion A. The average particle diameter of white particles W2 obtained is 13.11 µm. The abundance ratio of amorphous particles in white particles W2 is determined to be 3.5% by a conventional method using FE-SEM (field emission scanning electron microscope).

-Preparation of Dispersion B-

The following components are mixed and pulverized with a ball mill using zirconia balls with a diameter of 10 mm for 20 hours to prepare dispersion B. The viscosity of this dispersion B (oil phase) is 623 mPa·s.

<Composition>
cyclohexyl methacrylate: 56 parts by mass
titanium oxide (white pigment): 38 parts by mass (tradename:Tiepake CR53, primary particle diameter 0.3 µm, manufactured by Ishihara Sangyo Kaisha, Ltd.)
polymer fine particles (hollow particles): 5 parts by mass (tradename:SX866, primary particle diameter 0.3 µm, manufactured by JSR Corporation)
charge controlling agent: 1 part by mass (tradename:SBT-5-0016, manufactured by Orient Chemical Industries, Ltd.)

(Preparation of White Particles W3)

White particles W3 are prepared by the same method as preparing white particles W1, except that dispersion C is used in place of dispersion A. White particles W3 obtained had an average particle diameter of 14.38 µm, and abundance ratio of the amorphous particles in white particles W3 is determined to be 3.0% by a conventional method using FE-SEM (field emission scanning electron microscope).

-Preparation of Dispersion C-

The following components are mixed and pulverized with a ball mill using zirconia balls with a diameter of 10 mm for 20 hours to prepare dispersion C. The viscosity of this dispersion C (oil phase) is 513 mPa·s.

<Composition>
cyclohexyl methacrylate: 64 parts by mass
titanium oxide (white pigment): 30 parts by mass (tradename:Tiepake CR53, primary particle diameter 0.3 μm, manufactured by Ishihara Sangyo Kaisha, Ltd.)
polymer fine particles (hollow particles): 5 parts by mass (tradename:SX866, primary particle diameter 0.3 μm, manufactured by JSR Corporation)
charge controlling agent: 1 part by mass (tradename:SBT-5-0016, manufactured by Orient Chemical Industries, Ltd.)

(Preparation of White Particles W4)

White particles W4 are prepared by the same method as preparing white particles W1, except that following dispersion D is used in place of dispersion A. White particles W4 obtained had an average particle diameter of 12.45 μm, and abundance ratio of the amorphous particles in white particles W4 is determined to be 6.5% by a conventional method using FE-SEM (field emission scanning electron microscope).

-Preparation of Dispersion D-

The following components are mixed and pulverized with a ball mill using zirconia balls with a diameter of 10 mm for 20 hours to prepare dispersion D. The viscosity of this dispersion D (oil phase) is 813 mPa·s.

<Composition>
cyclohexyl methacrylate: 67 parts by mass
titanium oxide (white pigment): 30 parts by mass (tradename:Tiepake CR63, primary particle diameter 0.3 μm, manufactured by Ishihara Sangyo Kaisha, Ltd.)
polymer fine particles (hollow particles): 5 parts by mass (tradename:SX866, primary particle diameter 0.3 μm, manufactured by JSR Corporation)
charge controlling agent: 10 part by mass (SBT-5-0016, manufactured by Orient Chemical Industries, Ltd.)

(Preparation of White Particles W5)

White particles W5 are prepared by the same method as preparing white particles W1, except that following dispersion E is used in place of dispersion A. White particles W5 obtained had an average particle diameter of 13.11 μm, and abundance ratio of the amorphous particles in white particles W5 is determined to be 7.5% by a conventional method using FE-SEM (field emission scanning electron microscope).

-Preparation of Dispersion E-

The following components are mixed and pulverized with a ball mill using zirconia balls with a diameter of 10 mm for 20 hours to prepare dispersion E. The viscosity of this dispersion E (oil phase) is 1950 mPa·s.

<Composition>
cyclohexyl methacrylate: 64 parts by mass
titanium oxide (white pigment): 30 parts by mass (tradename:Tiepake CR63, primary particle diameter 0.3 μm, manufactured by Ishihara Sangyo Kaisha, Ltd.)
polymer fine particles (hollow particles): 10 parts by mass (tradename:X866, primary particle diameter 0.3 μm, manufactured by JSR Corporation)
charge controlling agent: 1 part by mass (tradename:SBT-5-0016, manufactured by Orient Chemical Industries, Ltd.)

(Preparation of Black Particles B1)

Black particles B1 are prepared by the same method as preparing white particles W1, except that following dispersion F is used in place of dispersion A. White particles B1 obtained had an average particle diameter of 13.28 μm, and abundance ratio of the amorphous particles in black particles B1 is determined to be 3.0% by a conventional method using FE-SEM (field emission scanning electron microscope).

-Preparation of Dispersion F-

The following components are mixed and pulverized with a ball mill using zirconia balls with a diameter of 10 mm for 20 hours to prepare dispersion F. The viscosity of this dispersion F (oil phase) is 10.5 mPa·s.

<Composition>
methyl methacrylate: 87.2 parts by mass
diethylaminoethyl methacrylate: 1.8 parts by mass
micro-lith black: 10 parts by mass (manufactured by Ciba Specialty Chemicals Inc.)
charge controlling agent: 1 part by mass (Copy Charge PSY VP2038, mabufactured by Clariant (Japan) K.K.)

(Preparation of Black Particles B2)

Black particles B2 are prepared by the same method as preparing white particles W1, except that following dispersion G is used in place of dispersion A. White particles B2 obtained had an average particle diameter of 14.86 μm, and abundance ratio of the amorphous particles in black particles B2 is determined to be 5.5% by a conventional method using FE-SEM (field emission scanning electron microscope).

-Preparation of Dispersion G-

The following components are mixed and pulverized with a ball mill using zirconia balls with a diameter of 10 mm for 20 hours to prepare dispersion G. The viscosity of this dispersion G (oil phase) is 3.5 mPa·s.

<Composition>
methyl methacrylate: 86.2 parts by mass
diethylaminoethyl methacrylate: 1.8 parts by mass
micro-lith black: 10 parts by mass (manufactured by Ciba Specialty Chemicals Inc.)
charge controlling agent: 2 part by mass (Copy Charge PSY VP2038, mabufactured by Clariant (Japan) K.K.)

The abundance ratios in the white particles and black particles thus prepared, and viscosity of the dispersion (oil phase) used for preparing these particles are shown in Table 1.

TABLE 1

| | Abundance Ratio of Amorphous Particles in White/Black Particles (%) | Viscosity of Dispersion used for Preparing White/Black Particles (mPa · s) |
|---|---|---|
| White Particles W1 | 2.5 | 589 |
| White Particles W2 | 3.5 | 623 |
| White Particles W3 | 3.0 | 513 |
| White Particles W4 | 6.5 | 813 |
| White Particles W5 | 7.5 | 1950 |
| Black Particles B1 | 3.0 | 10.5 |
| Black Particles B2 | 5.5 | 3.5 |

Examples 1 to 4 and Comparative Examples 1 to 3

The white and black particles prepared as described above are used by combining as shown in Tables 2 and 3. The image display medium and image forming apparatus having the constructions as shown in FIG. 6 are manufactured as follows.

-Manufacture of Image Display Medium/Image Forming Apparatus-

The white and black particles are mixed in a mass ratio of 6:5 by each combination shown in Tables 2 and 3, and a prescribed quantity of the mixed particles are enclosed in a space between two substrates (display substrate 14 and non-display substrate 16) facing to one another. The image display medium 10 is manufactured by a conventional method, and the image forming apparatus 12 is manufactured by disposing the printing electrode 11 so that it comes close to the image display medium 10. Then, the following initializing treatment is applied.

A desired electric field is applied to the particle group between the substrates by applying a voltage between the substrates in order to allow respective particles to move between the substrates. The particles are transported between the substrates by repeatedly switching polarity of the voltage, and reciprocate between the substrates. The particles are charged with respectively different polarity in this process by collision between the particles and between the substrates and particles.

The white particles are positively charged while the black particles are negatively charged, and are transported in different directions to one another according to the electric field between the substrates. When the electric field is fixed in one direction, each type of the particles are adhered to respective substrates to enable uniform, high density and high contrast images to be displayed without any irregularity of the image.

-Repeating Display Test and Evaluation of Reflection Density/Contrast-

The voltage is switched a total of 21,000 cycles with 16,000 cycles by 1 second interval and 5,000 cycles by 0.1 second interval. The reflection density of the white display portion (or black display portion) of the image after 21,000 cycles of repetition, and the corresponding contrast of the reflection density (the difference between the reflection densities of the white display portion and black display portion) are measured.

The reflection density is measured at five sites within a patch with an area of 20 mm×20 mm displaying the white color (or black color) of the image display medium using a densitometer X-Rite 404, and the reflection densities obtained from five patches are averaged. The results are shown in Tables 2 and 3.

Table 2 shows the results when the particles for a display device of the invention are used as the black particles, and the particles for a display device of the invention are used or not used as the white particles. Table 3 shows the results when the particles for a display device of the invention are used as the white particles, and the particles for a display device of the invention are used or not used as the black particles.

TABLE 2

| | White particles | Black particles | Abundance ratio of amorphous particles in white particles (%) | Abundance ratio of amorphous particles in black particles (%) | Drive voltage (v) | Reflection density of white display portion | Contrast |
|---|---|---|---|---|---|---|---|
| Example 1 | W1 | B1 | 2.5 | 3.0 | 160 | 0.42 | 12.3 |
| Example 2 | W2 | B1 | 3.5 | 3.0 | 180 | 0.51 | 9.33 |
| Example 3 | W3 | B1 | 3.0 | 3.0 | 130 | 0.46 | 11.3 |
| Comparative example 1 | W4 | B1 | 6.5 | 3.0 | 185 | 0.51 | 7.24 |
| Comparative example 2 | W5 | B1 | 7.5 | 3.0 | 260 | Display is impossible | — |

TABLE 3

| | White particles | Black particles | Abundance ratio of amorphous particles in white particles (%) | Abundance ratio of amorphous particles in black particles (%) | Drive voltage (v) | Reflection density of black display portion | Contrast |
|---|---|---|---|---|---|---|---|
| Example 4 | W1 | B1 | 2.5 | 3.0 | 200 | 1.51 | 12.3 |
| Comparative example 3 | W1 | B2 | 2.5 | 5.5 | 300 | 1.31 | 6.9 |

A first aspect of the invention is to provide particles for a display device having a positively or negatively chargeable property and color, wherein an abundance ratio of amorphous particles with a major axis to minor axis length ratio of approximately 1.2 or greater is approximately 5% or less by number.

Preferably, the abundance ratio of the amorphous particles is approximately 4% or less by number in the particles for a display device of the invention.

The particles for a display device of the invention may be prepared by using a colorant and a resin.

The particles for a display device of the invention may contain any one of the colorants selected from a group consisting of carbon black and titanium oxide.

The particles for a display device of the invention may contain titanium oxide as a white colorant.

The particles for a display device of the invention may contain at least, as the white colorant, two types of titanium oxide having different average particle diameters.

The particles for a display device of the invention may contain, as the white colorant, titanium oxide with a primary particle diameter of approximately 0.1 to 1.0 μm and titanium oxide with a primary diameter of less than approximately 0.1 μm.

The particles for a display device of the invention may contain approximately 1 to 60% by mass of colorant relative to the total mass of the particles for a display device when the specific gravity of the colorant is 1.

The particles for a display device of the invention may contain a pigment having a color difference (ΔE*ab) of light-fastness of approximately 0.2 or less and a color difference (ΔE*ab) of heat resistance of not lower than approximately 200° C. as the colorant.

The particles for a display device according to the invention can use a master batch pigment as the colorant.

The particles for a display device according to the invention can have a volume average particle diameter of approximately 1 to 100 µm.

The particles for a display device according to the invention can have a volume average particle diameter of approximately 3 to 30 µm.

A second aspect of the invention is to provide a method for manufacturing particles for a display device comprising at least; forming particles having a positively or negatively chargeable property and color, in which an abundance ratio of amorphous particles with a major axis to minor axis length ratio of approximately 1.2 or greater is approximately 5% or less by number, by dispersing an oil phase in an aqueous phase, wherein the oil phase has a viscosity in the range of approximately 5 to 800 mPa·s.

Preferably, the viscosity of the oil phase is in the range of approximately 5.5 to 600 mPa·s in the method for manufacturing the particles for a display device of the invention.

Preferably, the viscosity of the oil phase is in the range of approximately 6 to 500 mPa·s in the method for manufacturing the particles for a display device of the invention.

A third aspect of the invention is to provide an image display medium comprising at least a pair of substrates disposed opposite each other and particle groups comprising at least two or more types of particles enclosed in a space between pair of the substrates, at least one type of the two or more types of the particles has a positively chargeable property while the other at least one type of the particles having a negatively chargeable property, the positively and negatively chargeable particles being colored differently from one another, both the positively and negatively chargeable particles containing amorphous particles having a major axis to minor axis length ratio of approximately 1.2 or greater in a proportion of 5% or less by number.

At least one type of the particles of the two or more type of the particles may be white particles in the image display medium of the invention.

At least one type of the particles of the two or more types of the particles are black particles in the image display medium of the invention.

A fourth aspect of the invention is to provide an image forming apparatus for forming an image on an image display medium comprising at least a pair of substrates disposed opposite each other and particle groups comprising at least two or more types of particles enclosed in a space between pair of the substrates, at least one type of the two or more types of the particles having a positively chargeable property while the other at least one type of the particles having a negatively chargeable property, the positively and negatively chargeable particles being colored differently from one another, and both the positively and negatively chargeable particles containing amorphous particles having a major axis to minor axis length ratio of approximately 1.2 or greater in a proportion of 5% or less by number, wherein the image forming apparatus comprises an electric field generating unit for generating an electric field corresponding to the image between a pair of substrates.

The invention provides particles for a display device capable of being addressed by a low addressing voltage and having high contrast even after repeatedly displaying the image for a long period of time and a method for manufacturing the same, and an image display device using the particles for a display device and an image forming apparatus using the image display medium.

What is claimed is:

1. Particles for forming an image in a display device comprising a positively or negatively chargeable property and color, wherein an abundance ratio of particles within the display device with a major axis to minor axis length ratio of approximately 1.2 or greater is approximately 5% or less by number, and further comprising, as the white colorant, at least two types of titanium oxide having different average particle diameters.

2. Particles for forming an image in a display device comprising a positively or negatively chargeable property and color, wherein an abundance ratio of particles within the display device with a major axis to minor axis length ratio of approximately 1.2 or greater is approximately 5% or less by number, and further comprising, as the white colorant, titanium oxide with a primary particle diameter of approximately 0.1 to 1.0 µm and titanium oxide with a primary diameter of less than approximately 0.1 µm.

3. Particles for forming an image in a display device comprising a positively or negatively chargeable property and color, wherein an abundance ratio of particles within the display device with a major axis to minor axis length ratio of approximately 1.2 or greater is approximately 5% or less by number, and further comprising approximately 1 to 60% by mass of colorant relative to the total mass of the particles for a display device when the specific gravity of the colorant is 1.

4. Particles for forming an image in a display device comprising a positively or negatively chargeable property and color, wherein an abundance ratio of particles within the display device with a major axis to minor axis length ratio of approximately 1.2 or greater is approximately 5% or less by number, and further comprising a master batch pigment as the colorant.

5. An image display medium comprising at least a pair of substrates disposed opposite each other and particle groups comprising at least two or more types of particles enclosed in a space between pair of substrates, at least one type of the two or more types of the particles having a positively chargeable property while the other at least one type of the particles having a negatively chargeable property, the positively and negatively chargeable particles being colored differently from one another, both the positively and negatively chargeable particles within the image display medium containing particles having a major axis to minor axis length ratio of approximately 1.2 or greater in a proportion of 5% or less by number.

6. An image display medium according to claim 5, wherein at least one type of the particles of the two or more types of the particles are white particles.

7. An image display medium according to claim 5, wherein at least one type of the two or more types of the particles are black particles.

8. An image forming apparatus for forming an image on an image display medium comprising at least a pair of substrates disposed opposite each other and particle groups comprising at least two or more types of particles enclosed in a space between pair of the substrates, at least one type of the two or more types of the particles having a positively chargeable property while the other at least one type of the particles having a negatively chargeable property, the positively and negatively chargeable particles being colored differently from one another, and both the positively and negatively chargeable particles within the image forming apparatus containing particles having a major axis to minor axis length ratio of approximately 1.2 or greater in a proportion of 5% or less by number, wherein the image forming apparatus comprises an electric field generating unit for generating an electric field corresponding to the image between a pair of substrates.

* * * * *